W. A. DANIELS.
SPRING ROLLER SHADE FOR VEHICLES.
APPLICATION FILED FEB. 14, 1914.
1,135,161. Patented Apr. 13, 1915.
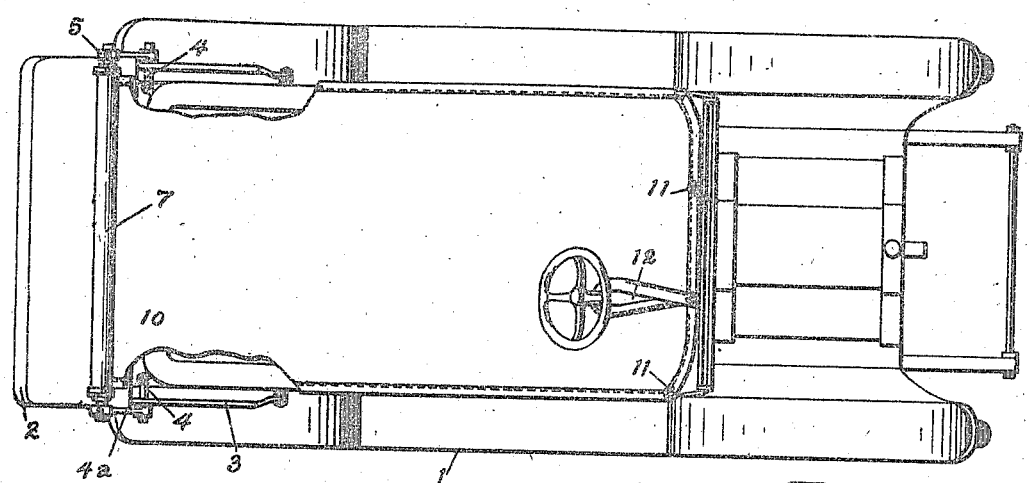
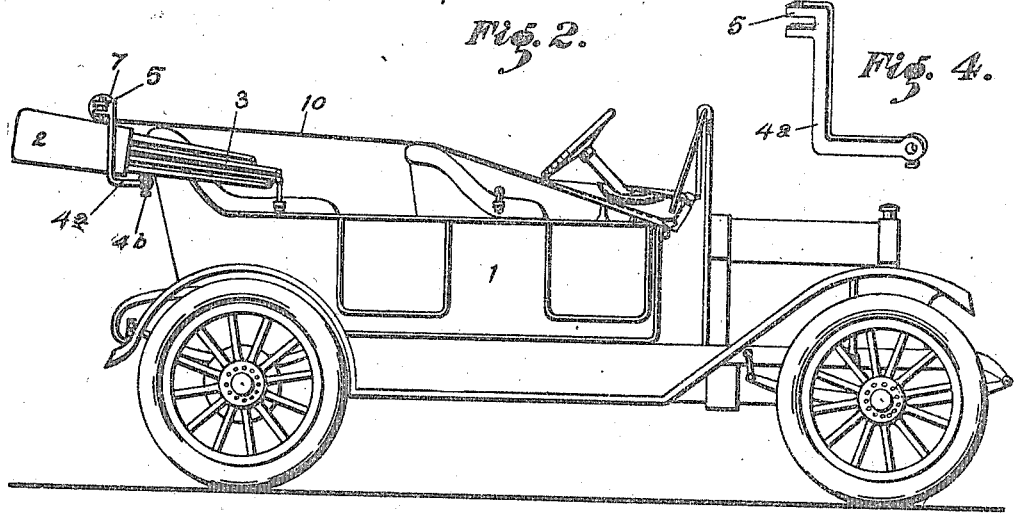
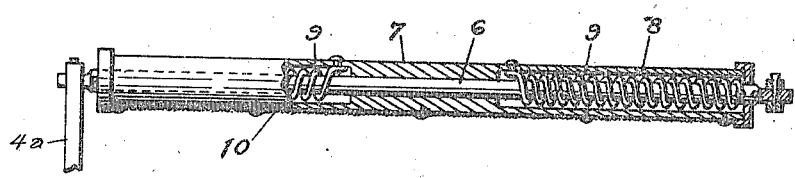
WITNESSES:
C. J. Milam
R. E. Brucker
INVENTOR
W. A. DANIELS
BY
John M. Spellman
ATTORNEY

UNITED STATES PATENT OFFICE.

WILLIAM A. DANIELS, OF DERMOTT, ARKANSAS.

SPRING-ROLLER SHADE FOR VEHICLES.

1,135,161.  Specification of Letters Patent.  Patented Apr. 13, 1915.

Application filed February 14, 1914. Serial No. 818,722.

*To all whom it may concern:*

Be it known that I, WILLIAM A. DANIELS, a citizen of the United States, residing at Dermott, in the county of Chicot and State of Arkansas, have invented certain new and useful Improvements in Spring-Roller Shades for Vehicles, of which the following is a specification.

My invention relates to a new and useful spring roller shade for vehicles, and its object is to provide a shade which ordinarily will be wound upon a roller mounted at the rear of an automobile, and which when desired may be drawn from said roller and extended over the upholstery of the automobile to protect the same from the sun and rain and dust.

A still further object of the invention is to provide a device of the character described that will be strong, durable, efficient and simple and comparatively inexpensive to produce, also one in which the several parts will not be likely to get out of working order.

With the above and other objects in view, the invention has relation to certain novel features of construction and operation, an example of which is described in the following specification and illustrated in the accompanying drawing, wherein:

Figure 1 is a top view of an automobile equipped with my novel shade, showing the same extended to protect the upholstery of an automobile. Fig. 2 is a view of the same in side elevation. Fig. 3 is a detail view showing the spring roller upon which my shade is wound, said roller being shown in partial section. Fig. 4 is a detail perspective view of a bracket two of which are employed to support the extremities of my roller.

Referring now more particularly to the drawing, wherein like reference characters designate similar parts in all the figures, the numeral 1 denotes an automobile, the top 2 of which is supported by a plurality of rods 3, said top being collapsed at the rear of the automobile when not in use, at such times the rods 3 being supported by suitable bracket arms 4, mounted for that purpose upon the rear end of the car. The members 4 project laterally at each side of the automobile, and upon each of said members, there is mounted fast one extremity of an angular arm 4ª, a rigid relation being set up between the parts 4 and 4ª by set screws 4ᵇ. The arms 4ª are extended rearwardly from the brackets 4 a short distance and are then bent vertically, their upper ends being each provided with a pair of spaced rearwardly projecting fingers 5, between which may be engaged the extremities of an elongated rod passing loosely through the roller 7. The extremities of the roller 7 are deeply recessed, as indicated at 8, and within each of said recesses a spring 9 is coiled about the end portions of the rod 6, the outer extremity of each spring being rigidly engaged with the rod 6, and the inner extremities of the springs being secured to the member 7. To the roller 7, there is secured one extremity of an elongated shade 10, having a length and width sufficient to enable the shade to cover the upholstery of the automobile when said shade is drawn forwardly off the roller. The two springs 9, impress upon the roller 7 a tendency to rotation, tending to maintain the shade 10 wound upon said roller, and tend to automatically rewind the shade upon the roller when the shade is released at its forward extremity. The shade will preferably be formed of rubber or water-proof canvas, although any flexible fabric may be used. The front edge of the shade 10 when said shade is extended over the car is detachably secured to the body of the car just at the rear of the hood, the fastening means being indicated at 11. It is preferred to form the free end portion of the shade with an aperture 12 extending to the free edge, which will serve to receive the steering post.

When a car equipped with the above described device is allowed to stand in an exposed place for any length of time, the shade may be quickly drawn from its roller to protect the upholstery of the car, it being possible to adjust the shade in its extended position much more quickly than it is possible to raise the cover 2. If it is desired to raise the cover 2, the roller, with the shade in wound position, is quickly taken out of the brackets and stored in the car or outside, as convenient.

The invention is presented as including all such modifications and changes as properly come within the scope of the following claim.

What I claim is:

In a device of the character described, the combination with an automobile, of a pair of brackets mounted at the rear end of the car at each side thereof, a pair of angular arms respectively mounted upon said brackets, each arm being extended rearwardly and then upwardly, a spring roller mounted in said brackets, a shade mounted on said roller, and means for securing the free extremity of said shade to the forward portion of an automobile.

In testimony whereof I have signed my name to this specification in the presence of two subscribing witnesses.

WILLIAM A. DANIELS.

Witnesses:
W. J. SPLAWN,
R. J. DANIELS.